United States Patent
Choi (10) Patent No.: US 12,216,597 B2
(45) Date of Patent: Feb. 4, 2025

(54) MEMORY SYSTEM, INCLUDING A PLURALITY OF MEMORY CONTROLLERS AND OPERATION METHOD THEREOF

(71) Applicant: SK hynix Inc., Gyeonggi-do (KR)

(72) Inventor: Hyeong Jae Choi, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 14 days.

(21) Appl. No.: 18/089,566

(22) Filed: Dec. 28, 2022

(65) Prior Publication Data
US 2024/0020250 A1 Jan. 18, 2024

(30) Foreign Application Priority Data
Jul. 13, 2022 (KR) .................. 10-2022-0086115

(51) Int. Cl.
*G06F 13/16* (2006.01)
*G06F 11/07* (2006.01)

(52) U.S. Cl.
CPC ...... *G06F 13/1694* (2013.01); *G06F 11/0772* (2013.01); *G06F 13/1642* (2013.01)

(58) Field of Classification Search
CPC ............. G06F 13/1694; G06F 13/1642; G06F 13/1668; G06F 13/161; G06F 3/061; G06F 3/0635; G06F 3/0679
See application file for complete search history.

(56) References Cited

U.S. PATENT DOCUMENTS

| | | | |
|---|---|---|---|
| 10,956,342 B1* | 3/2021 | MacLaren | G06F 12/1425 |
| 2004/0117562 A1* | 6/2004 | Wu | G06F 12/0866 |
| | | | 709/213 |
| 2010/0082857 A1* | 4/2010 | Klein | G06F 13/1684 |
| | | | 710/110 |
| 2014/0325148 A1* | 10/2014 | Choi | G06F 3/0659 |
| | | | 711/114 |
| 2016/0054944 A1* | 2/2016 | Herrell | G06F 3/067 |
| | | | 711/154 |
| 2016/0371012 A1* | 12/2016 | Song | G06F 3/0688 |
| 2017/0004095 A1* | 1/2017 | Takeda | G06F 3/0685 |
| 2017/0269836 A1* | 9/2017 | Yeh | G06F 3/061 |
| 2018/0059935 A1* | 3/2018 | Chun | G06F 3/0656 |

* cited by examiner

*Primary Examiner* — Tracy A Warren
(74) *Attorney, Agent, or Firm* — IP & T GROUP LLP (57) ABSTRACT

Disclosed is a memory controller including: a first external interface controller configured to communicate with a first external device and to receive a second external device access request message from the first external device; a second external interface controller configured to communicate with a second external device; a third external interface controller configured to communicate with a third external device, wherein the third external device is connected to a plurality of memory controllers, receive and store state information from the plurality of memory controllers, and determines a memory controller among the plurality of memory controllers for the second external device access request; and a main controller configured to determine, based on its state information, whether to process the second external device access request by itself or by another one of the plurality of memory controllers.

20 Claims, 7 Drawing Sheets

MEMORY SYSTEM, INCLUDING A PLURALITY OF MEMORY CONTROLLERS AND OPERATION METHOD THEREOF

CROSS-REFERENCE TO RELATED APPLICATIONS

The present application claims the benefit 35 U.S.C. 119(a) of Korea Patent Application No. 10-2022-0086115, filed Jul. 13, 2022, the entire contents of which is incorporated herein for all purposes by reference in its entirety.

FIELD

Various embodiments relate to a memory system, a memory controller, and operation methods thereof, and particularly to a memory system including a multi-memory controller, a memory controller, and operation methods thereof.

BACKGROUND

Recently, portable electronic devices such as a mobile phone, a tablet PC, a black box, a laptop, etc., are widely used. For the purpose of meeting the constraint, for example, the weight, size, etc., of the portable electronic device, a non-volatile memory system is generally used rather than a magnetic disk type storage used in a computer. Compared to the magnetic disc type storage, the non-volatile memory system has excellent safeness and durability due to no mechanical driving part, very high data writing and reading speed, and has a lower power consumption.

The non-volatile memory system may include a memory controller for controlling a memory. The memory controller may obtain a command from a host and may perform writing data to a memory, reading data from a memory, or erasing a memory, etc., in accordance with the obtained command.

The non-volatile memory system may further include a separate volatile memory for temporarily storing data to be written to a non-volatile memory or data to be read from the non-volatile memory.

The volatile memory may maintain data stored therein only when power is supplied and may lose the stored data when the power supply is disconnected. The non-volatile memory may not lose the stored data even though the power supply is disconnected.

A typical non-volatile memory system may delay a response to a request of the host when the memory controller has problems or is in operation.

Even when the controller has problems or is in operation in the non-volatile memory system, there is a demand for a technology for preventing the response to the request of the host from being delayed.

SUMMARY

Even in the non-volatile memory system including a multi-memory controller, problems may occur in the memory controller receiving the request of the host, or a response to the request of the host may be delayed when the memory controller is performing other operations.

Various embodiments of the present disclosure reflect the recognition of the above problems. In a case where a plurality of the memory controllers sharing namespaces is provided, when problems occur in the memory controller receiving the request of the host for the namespace or when the memory controller is performing other operations, it is intended to provide a memory system in which another memory controller is capable of processing the request of the host.

The technical problem to be overcome in the present disclosure is not limited to the above-mentioned technical problems. Other technical problems not mentioned can be clearly understood from those described below by a person having ordinary skill in the art.

An embodiment of the present disclosure provides a memory controller including a first external interface controller configured to communicate with a first external device and to receive a second external device access request message from the first external device; a second external interface controller configured to communicate with a second external device; a third external interface controller configured to communicate with a third external device, wherein the third external device is connected to a plurality of memory controllers, receive and store state information from the plurality of memory controllers, and determines a memory controller among the plurality of memory controllers for the second external device access request; and a main controller configured to determine, based on its state information, whether to process the second external device access request by itself or by another one of the plurality of memory controllers.

Another embodiment of the present disclosure provides a memory system including: a memory device; a plurality of memory controllers which are accessible to the memory device and determines, based on its state information, whether to process a request for accessing the memory device from a first external device (e.g., a host) by themselves or by another memory controller; and a cooperative controller which is connected to the plurality of memory controllers, receives and stores state information from the plurality of memory controllers, and determine, based on the state information, a memory controller among the plurality of memory controllers for processing the memory device access request.

Another embodiment of the present disclosure provides an operating method of a memory system having plural controllers, the operating method comprising: receiving, by a first controller, a request to access a memory device from a host; determining, by the first controller, process the request by itself or by another one of the plural controllers based on the state information of the first controller; determining, by the first controller, when determining to process the request by another one of the plural controllers, a second controller to process the request from among candidate controllers, each of which is available for accessing the memory device; and transferring, by the first controller or the second controller, a result of the access to the memory device to the host.

According to various embodiments of the present disclosure, when problems occur in the memory controller receiving the request of the host for the namespace or when the memory controller is performing other operations, another memory controller is capable of processing the request of the host, so that it is possible to prevent the response delay of the memory system and to improve the performance of the memory system.

Advantageous effects that can be obtained from the present disclosure are not limited to the above-mentioned effects. Further, other unmentioned effects can be clearly understood from the following descriptions by those skilled in the art to which the present disclosure belongs.

DETAILED DESCRIPTION

The features, advantages and methods for accomplishment of the present invention will be more apparent from referring to the following detailed embodiments described as well as the accompanying drawings. However, the present invention is not limited to the embodiments to be disclosed below and can be implemented in different and various forms. The embodiments bring about the complete disclosure of the present invention and are provided to make those skilled in the art fully understand the scope of the present invention. The present invention is just defined by the scope of the appended claims. The same reference numerals throughout this disclosure correspond to the same elements.

When one component is referred to as being "connected to" or "coupled to" another component includes both a case where one component is directly connected or coupled to another component and a case where a further another component is interposed between them. Moreover, when one component is referred to as being "directly connected to" or "directly coupled to" another component indicates that a further other component is not interposed between them. The term "and/or" includes each of the mentioned items and one or more of all of the combinations thereof.

Terms used in the present specification are provided for description of only specific embodiments of the present invention, and are not intended to be limiting. In the present specification, an expression of a singular form includes the expression of plural form thereof if not specifically stated. The terms "comprises" and/or "comprising" used in the specification is intended to specify characteristics, numbers, steps, operations, components, parts or any combination thereof which are mentioned in the specification, and intended not to exclude the existence or addition of at least one of characteristics, numbers, steps, operations, components, parts or any combination thereof.

While terms such as the first and the second, etc., can be used to describe various components, the components are not limited by the terms mentioned above. The terms are used only for distinguishing between one component and other components. Therefore, the first component to be described below may be the second component within the spirit of the present invention. Unless differently defined, all terms used herein including technical and scientific terms have the same meaning as commonly understood by one of ordinary skill in the art to which the present invention belongs. Also, commonly used terms defined in the dictionary should not be ideally or excessively construed as long as the terms are not clearly and specifically defined in the present application.

Hereinafter, embodiments of the present disclosure will be described in detail with reference to the accompanying drawings.

Figure 1:
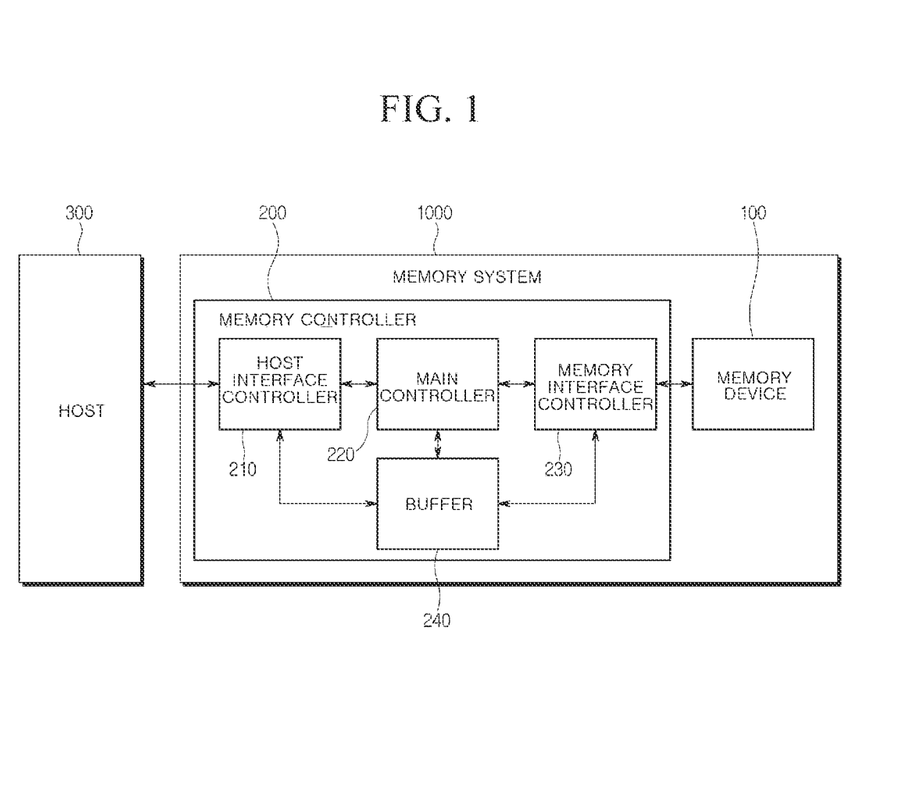
FIG. 1 shows a configuration of a memory system according to an embodiment of the present disclosure.

FIG. 1 shows a configuration of a memory system 1000 according to an embodiment of the present disclosure.

Referring to FIG. 1, the memory system 1000 may include a memory device 100 including at least one non-volatile memory and may include a memory controller 200 that controls the operation of the memory device 100. The memory system 1000 stores data in accordance with the control of a host 300 such as a mobile phone, a smart phone, an MP3 player, a laptop computer, a desktop computer, a game machine, a TV, a tablet PC, or an in-vehicle infotainment (IVI) system, etc.

The memory system 1000 may be divided into various types according to a host interface method used for communication with the host 300, a configuration of the memory system, and the like. For example, the memory system 1000 may be divided into various types such as a solid-state drive (SSD), a multimedia card (MMC), an embedded multimedia card (eMMC), an RS-MMC, a micro-MMC, secure digital (SD), mini-SD, micro-SD, a universal storage bus (USB), a universal flash storage (UFS), a personal computer memory card international association (PCMCIA) card, a peripheral component interconnection (PCI) card, a PCI express (PCIe) card, a compact flash (CF) memory, smart media, a memory stick, etc.

The memory device 100 is a physical device for storing data, and may include a NAND flash memory, a vertical NAND flash memory, a NOR flash memory, and a resistive random-access memory (RRAM), a phase-change memory (PRAM), a magnetoresistive random-access memory (MRAM), a ferroelectric random-access memory (FRAM), a spin transfer torque random access memory (STT-RAM) and the like. In this specification, for convenience of description, the memory device 100 is a NAND flash memory.

The memory device 100 may operate in response to the control of the memory controller 200 and may include a plurality of memory cells capable of storing data.

One memory cell may store one data bit, two data bits, three data bits, or four data bits depending on its structure.

The plurality of memory cells may be gathered to form one page. According to the embodiment, the page may indicate a minimum unit used to write data to the memory device 100 or to read data from the memory device 100.

A memory block may include a plurality of pages, and may be used as a minimum unit when data is erased from the memory device 100.

The memory cell array may include a plurality of memory blocks.

The memory device 100 is configured to receive a command and an address from the memory controller 200 and to access a region selected by the address in the memory cell array. That is, the memory device 100 may perform an operation directed by the command with respect to the region selected by the address. For example, the memory device 100 may perform a write operation (i.e., program operation), a read operation, and an erase operation. During the write operation, the memory device 100 may write (i.e., program) data in the region selected by the address. During the read operation, the memory device 100 may read the data from the region selected by the address. During the erase operation, the memory device 100 may erase the data stored in the region selected by the address.

The memory controller 200 may control the overall operation of the memory system 1000.

When power is applied to the memory system 1000, the memory controller 200 may execute firmware (FW). When the memory device 100 is a flash memory device, the memory controller 200 may execute firmware such as a flash translation layer (FTL) for data processing between the host 300 and the memory device 100.

The memory controller 200 may control the memory device 100 to execute the program operation, the read operation, or the erase operation according to a request of the host 300. During the program operation, the memory controller 200 may provide a write command, a physical block address, and data to the memory device 100. During the read operation, the memory controller 200 may provide a read command and the physical block address to the memory device 100. During the erase operation, the memory controller 200 may provide an erase command and the physical block address to the memory device 100.

The memory controller 200 may generate a command, an address, and data of its own accord regardless of the request of the host 300 and transmit them to the memory device 100. For example, the memory controller 200 may provide a command, an address, and data to the memory device 100 in order to perform background operations such as a program operation for wear leveling and a program operation for garbage collection.

In order to perform the above-described operations, the memory controller 200 may include a host interface controller (HIC) 210, a main controller (MC) 220, a memory interface controller (MIC) (230) and a buffer 240. According to the embodiment, the memory controller 200 may be implemented by one integrated chip (IC), but it is not limited thereto. The memory controller 200 may be implemented by a plurality of ICs according to another embodiment.

The main controller 220 may control all operations of the memory controller and may perform logical operations. The main controller 220 may communicate with the external host 300 through the host interface controller 210 and may communicate with at least one memory device 100 through the memory interface controller 230. Also, the main controller 220 may control the operation of the memory system by using the buffer 240 as an operation memory, a cache memory, or a temporary buffer.

The main controller 220 may perform a function of a flash translation layer. The main controller 220 may convert a logical address (LBA) provided by the host into a physical address (PBA) through the flash translation layer. The flash translation layer may convert the logical address (LBA) provided by the host into the physical address (PBA) corresponding to the LBA by using a mapping table such as an L2P map.

The host interface controller 210 may be configured to communicate with the external host 300. The host interface controller 210 may be configured to communicate with the host 300 by using at least one of various communication standards or interfaces such as a USB, a serial AT attachment (SATA), a serial attached SCSI (SAS), a high speed interchip (HSIC), a small computer system interface (SCSI), a peripheral component interconnection (PCI), PCI express (PCIe), non-volatile memory express (NVMe), a universal flash storage (UFS), SD, MMC, eMMC, etc.

The memory interface controller 230 may generate a control signal for the memory device 100 based on a memory access command obtained from the main controller 220. The memory interface controller 230 may provide a control signal, a physical address, and/or data to the memory device or receive data from the memory device 100 based on interface methods supported by the memory device 100.

The buffer 240 may be used as an operation memory, a cache memory, or a buffer memory of the host interface controller 210, the main controller 220, and the memory interface controller 230. The buffer 240 may store codes and commands executed by the host interface controller 210, the main controller 220, and the memory interface controller 230. The buffer 240 may temporarily store data processed by the host interface controller 210, the main controller 220, and the memory interface controller 230. The buffer 240 may include a static RAM (SRAM) or a dynamic RAM (DRAM).

A basic memory system 1000 shown in FIG. 1 can be extended to a memory system having multiple paths capable of providing two or more completely independent plural data transmission paths between the host 300 and the memory device 100, and/or a memory system that allows access to a shared memory device by using a plurality of the host interface controllers. Such extension may be necessarily required not only to reduce a memory access delay time and but also to increase the amount of data that can be transmitted, when the size of the memory provided by the memory device large. The multiple paths and shared memory functions essentially require the plurality of host interface controllers.

Figure 2:
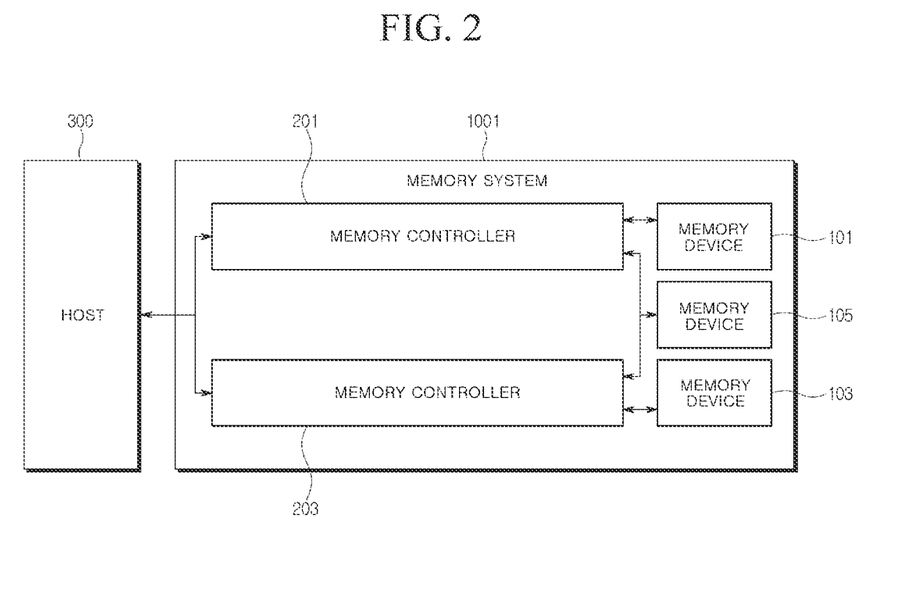
FIG. 2 shows a schematic structure of a memory system to which multiple paths and shared memory device access functions are added, in accordance with the embodiment of the present disclosure.

FIG. 2 shows a schematic structure of a memory system 1001 to which multiple paths and shared memory device access functions are added, in accordance with the embodiment of the present disclosure.

Referring to FIG. 2, the memory system 1001 may include a plurality of memory devices 101, 103, and 105 composed of at least one non-volatile memory and a plurality of memory controllers 201 and 203 for controlling operations of the plurality of memory devices 101, 103, and 105. The embodiment of FIG. 2 shows that the memory system 1001 includes two memory controllers and three memory devices. However, the embodiment is not limited thereto and a plurality of memory controllers and a plurality of memory devices may be provided.

Among the plurality of memory devices 101, 103, and 105, the first memory device 101 and the second memory device 103 may be dedicated memory devices for the memory controllers respectively, which can be controlled only by the first memory controller 201 and the second memory controller 203, respectively. The third memory device 105 may be a shared memory device which can be controlled by both the first memory controller 201 and the second memory controller 203. That is, the first memory controller 201 and the second memory controller 203 may independently access the third memory device 105 and may write data, read data, or erase a memory area. According to the embodiment, it is impossible for the first memory controller 201 and the second memory controller 203 to simultaneously access the third memory device 105, and only one of the two memory controllers can access the third memory device 103 that is a shared memory device, at a specific time.

When the shared memory is used, it may be indispensable to intervene such that only one of the two memory controllers controls the shared memory device at a specific time. In the embodiment, the intervention may be performed by the host 300 requesting access to the third memory device 103 from only one of the two memory controllers. However, this may not be advantageous in terms of delay time compared to a case where a plurality of separate memory systems 1000 is provided.

Also, in the structure shown in FIG. 2, in the case where the host 300 intends to read data from the third memory device 105 by using the first memory controller 201, when the first memory controller 201 is controlling the first memory device 101, a delay may occur until the first memory controller 201 completes the control of the first memory device 101. In this case, even if the second memory controller 203 is not performing any operation, the first memory controller 201 cannot delegate the control operation for the third memory device 103 to the second memory controller 203 and can start controlling the third memory device 105 after completing the operation that is currently being performed. That is, an attempt is made to reduce the delay time when reading data or programming with the multiple path structure for the shared memory. However, the actual delay time may not be reduced.

The present disclosure proposes a method for reducing the delay time in the above-described situation. Accordingly, the present disclosure proposes a memory system including a cooperative controller capable of controlling a data processing request between the plurality of memory controllers that allows the host 300 to access the memory device more quickly, and an operation method thereof.

Figure 3:
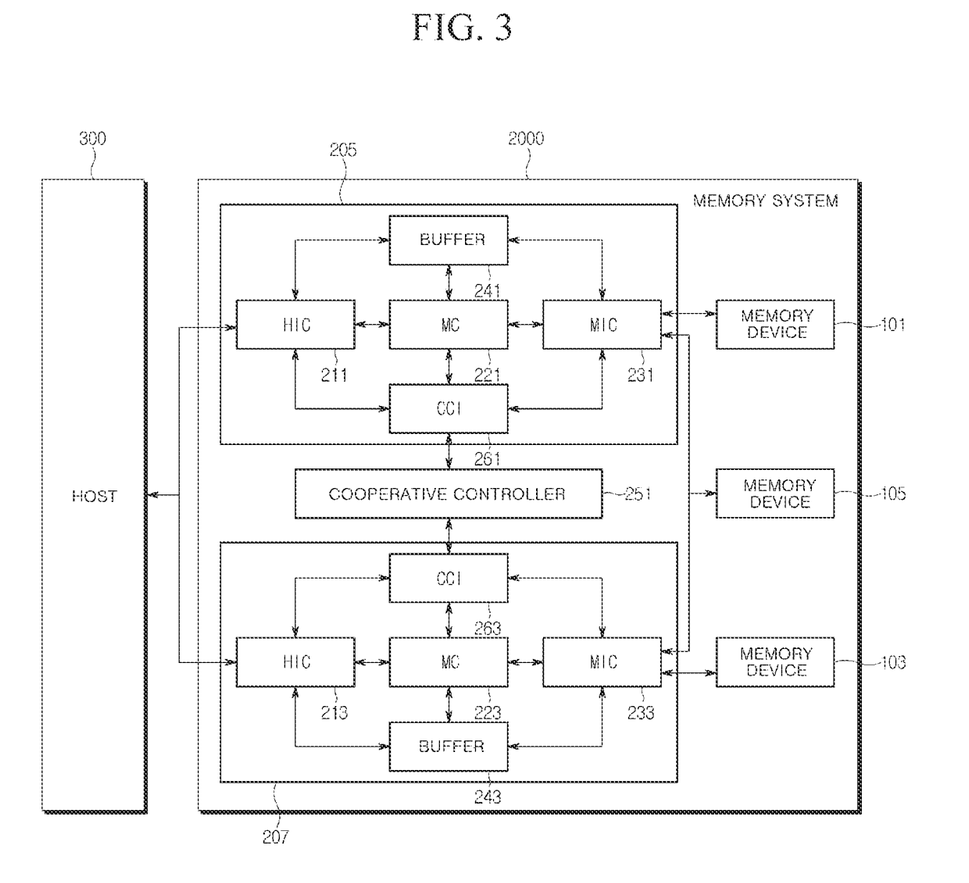
FIG. 3 shows a schematic structure of a memory system to which multiple paths and shared memory device access functions are added, in accordance with various embodiments of the present disclosure.

FIG. 3 shows a schematic structure of a memory system 2000 to which multiple paths and shared memory device access functions are added, in accordance with various embodiments of the present disclosure.

Referring to FIG. 3, the memory system 2000 includes a plurality of memory devices 101, 103, and 105 composed of at least one non-volatile memory, a plurality of memory controllers 205 and 207 for controlling operations of the plurality of memory devices 101, 103, and 105, and a cooperative controller 251.

The memory controllers 205 and 207 may include a host interface controller (HIC) 211 and 213, a main controller (MC) 221 and 223, and a memory interface controller (MIC) 231 and 233, buffers 241 and 243, and cooperative controller interfaces (CCI) 261 and 263. Compared with FIG. 1, all of the functions of the memory controller 200 may be performed in the same manner. In addition to this, each controller of the memory controller may perform additional functions for cooperation with other memory controllers.

The additional functions for cooperation proposed in the present disclosure may be that when a delay may occur during the process of a new request that has come in from the host 300 in a busy state where the memory controllers 205 and 207 are processing a request of another host 300 or a delay may occur when there may occur a problem in accessing the common memory device 105 so that the corresponding request cannot be processed, a request for access to the common memory device 105 is delegated to another memory controller and another memory controller may process the request instead.

In order to perform such a cooperative function, the memory system 2000 may additionally include the cooperative controller 251 as shown in FIG. 3, and the memory controllers 205 and 207 may additionally include cooperative controller interfaces 261 and 263 for performing communication with the cooperative controller 251, respectively. The cooperative controller 251 may be connected to all memory controllers 205 and 207 in the memory system 2000. According to another embodiment, the cooperative controller 251 may be connected only to a memory controller capable of controlling the common memory device 105.

According to the embodiment, the memory controllers 205 and 207 connected to the cooperative controller 251 may transmit information on their states to the cooperative controller 251. For example, in instances when the memory controllers 205 and 207 access the common memory device 105, in a case where abnormal operations are performed such as when there is an error in read data, an unexpectedly long time is taken during writing, or the writing fails, the memory controllers 205 and 207 may transmit, to the cooperative controller 251, state information indicating that there is a problem in accessing the common memory device 105. Also, when the memory controllers 203 and 207 process the request of the host 300 and then are transmitting data, the memory controllers 203 and 207 may transmit, to the cooperative controller 251, state information indicating that another request is being processed. According to the embodiment, the memory controllers 203 and 207 may transmit the state information to the cooperative controller 251 in a regular cycle or when a related event occurs.

Accordingly, the cooperative controller 251 may write the state information of all connected memory controllers to an internal memory as shown in Table 1 below. Here, in Table 1, for a memory controller where a problem has occurred, the cooperative controller 251 may write 0 to a bit that indicates whether a problem has occurred, and for a memory controller where a problem has not occurred, the cooperative controller 251 may write 1 to the bit that indicates whether a problem has occurred. Also, for a memory controller which is processing another request, the cooperative controller 251 may write 0 to a bit that indicates whether another request is processed, and for a memory controller which is not processing another request, the cooperative controller 251 may write 1 to a bit that indicates whether another request is processed.

TABLE 1

| Memory Controller | State Information | |
|---|---|---|
| | Whether a problem has occurred | Whether another request is processed |
| 205 | Good(1)/Poor(0) | Idle(1)/Busy(0) |
| 207 | Good(1)/Poor(0) | Idle(1)/Busy(0) |
| XXX | Good(1)/Poor(0) | Idle(1)/Busy(0) |

When the memory controllers 205 and 207 receive a request for access to the common memory device 105 from the host 300, the memory controllers 205 and 207 can determine their own state. For example, the memory controllers 205 and 207 may be currently processing another request or it may be problematic for the memory controllers 205 and 207 to access the common memory device 105. Then, the memory controllers 205 and 207 may obtain, from the cooperative controller 251, state information of other memory controllers 205 and 207 that can access the common memory device 105. Based on the obtained state information, if there is no problem in accessing the common memory device 105 and there are other memory controllers 205 and 207 that are not processing another request, the memory controllers 205 and 207 may request the corresponding memory controller to access the common memory device 105 and to process the request of the host 300.

In another embodiment, when receiving a request for access to the common memory device 105 from the host 300, the memory controllers 205 and 207 can determine their own state. For example, the memory controllers 205 and 207 may be currently processing another request, or it may be problematic for the memory controllers 205 and 207 to access the common memory device 105. Then, the memory controllers 205 and 207 transmit the request of the host 300 to the cooperative controller 251. If there are other memory controllers 205 and 207 that access directly the common memory device 105, the cooperative controller 251 can instruct a corresponding memory controller to process the request of the host 300. However, if another memory controller capable of processing the request does not exist, the cooperative controller 251 may transmit the request again to the memory controller that has received the corresponding request, so that the memory controller that has received the request from the host 300 can process the corresponding request.

Figure 4:
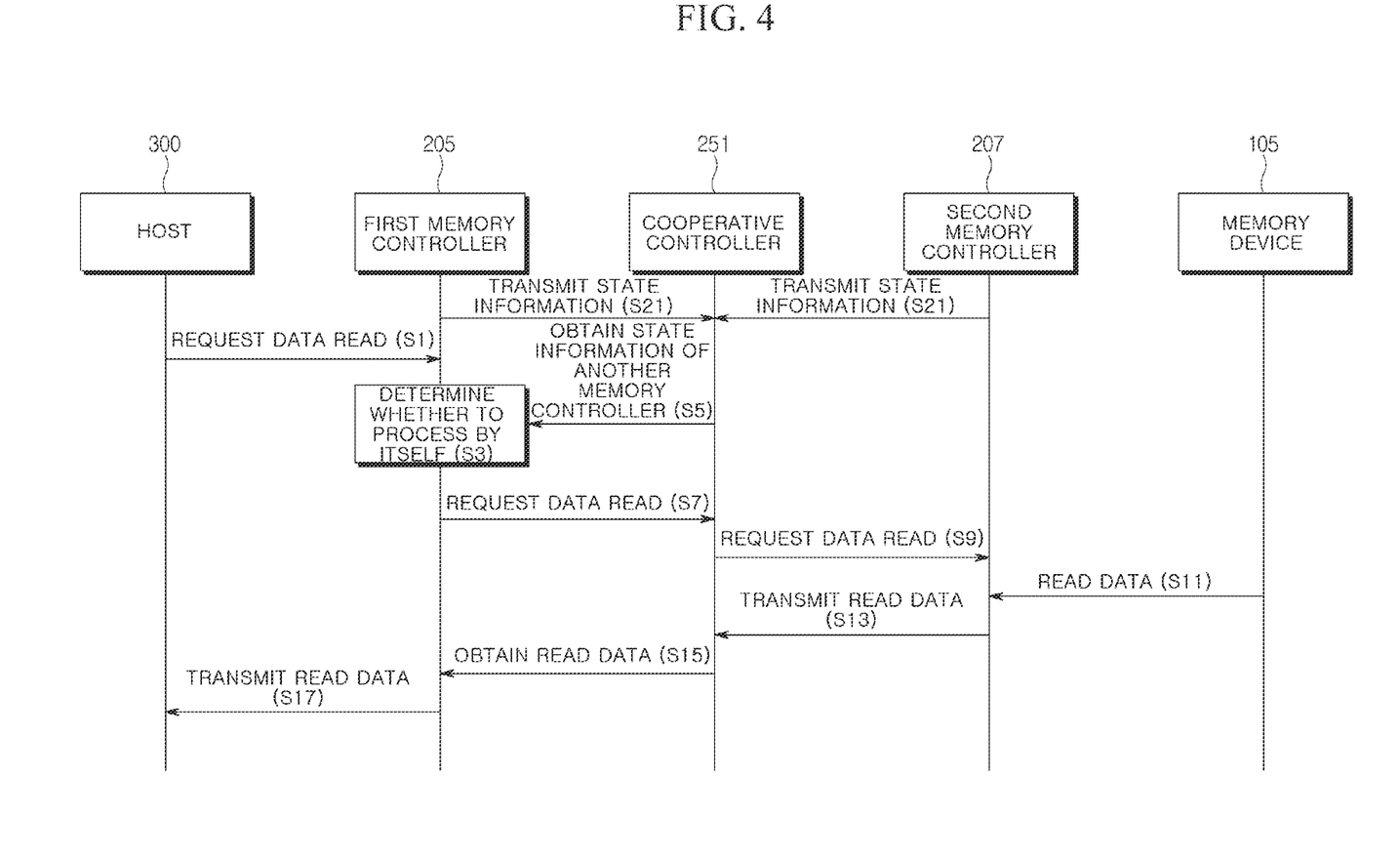
FIG. 4 is a sequence diagram showing an example of performing cooperation between memory controllers according to various embodiments of the present disclosure.

FIG. 4 is a sequence diagram showing an example of performing cooperation between the memory controllers according to various embodiments of the present disclosure. Although the sequence diagram of FIG. 4 shows an example of performing cooperation between the memory controllers according to a data read request from the host, the performing of cooperation between the memory controllers according to a data write request from the host can also be done in the same manner.

Referring to FIG. 4, in operation S21, all the memory controllers capable of accessing the common memory device 105 may transmit their state information to the cooperative controller 251. Each of the memory controllers may transmit the state information to the cooperative controller 251 periodically or when an event occurs. Here, the respective memory controllers do not transmit the state information at the same time and may transmit the state information independently of each other. Accordingly, the cooperative controller 251 can recognize in real time the state information of all the memory controllers that can access the common memory device 105.

In operation S1, the host 300 may provide the memory controller (i.e., first memory controller) 205 with a request of reading data from the common memory device 105. According to the embodiment, when the host 300 and the first memory controller 205 make the data read request based on an NVMe interface, the host 300 may write and store a 64-byte data read command to the internal memory, and may notify the first memory controller 205 that the data read command has been written. After the first memory controller 205 receives the notification, the first memory controller 205 may obtain the data read request by reading the data read command from the internal memory of the host 300. Here, addresses to be read included in the data read command may be a logical address recognized by the host 300.

In operation S3, the first memory controller 205 may determine whether to process the obtained data read request by itself. The first memory controller 205 may determine its own state and the state of another memory controller, and, based on this, may determine whether to process the request by itself.

According to the embodiment, in operation S5, the first memory controller 205 may obtain state information of another memory controller from the cooperative controller 251. The cooperative controller 251 may have state information of all memory controllers that can access the common memory device 105 based on a periodic update or an update according to an event. The first memory controller 205 requests state information from the cooperative controller 251, and the cooperative controller 251 transmits the state information of the memory controller, so that the first memory controller 205 can obtain the state information of another memory controller.

Figure 5:
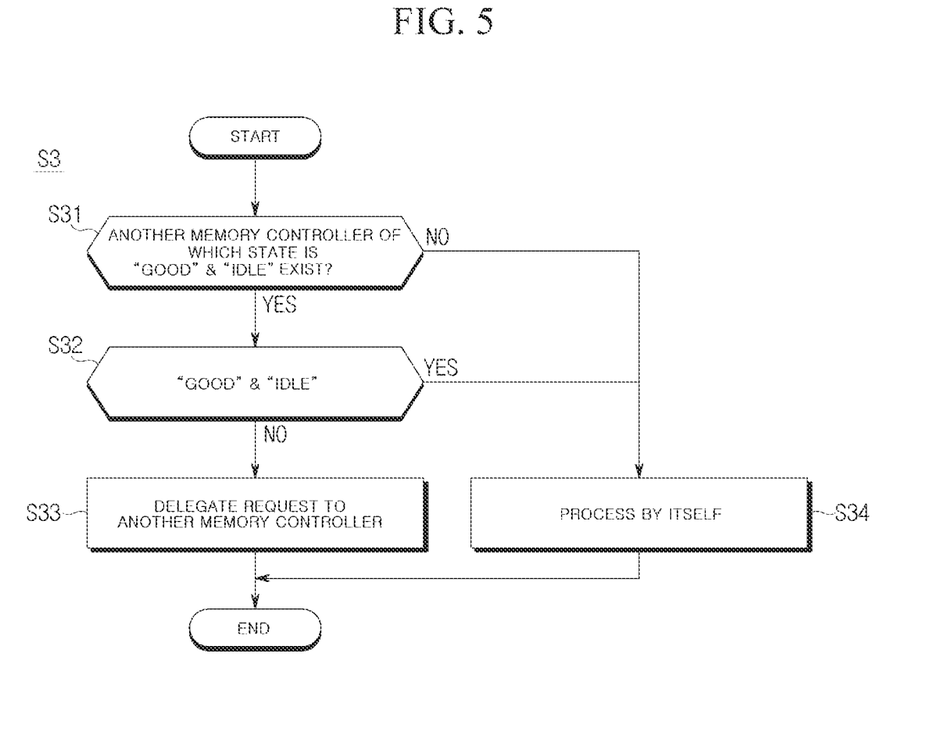
FIG. 5 is a flowchart showing a flow in which the memory controller determines whether to process the request of the host by itself, according to various embodiments of the present disclosure.

FIG. 5 is a flowchart showing a flow in which the memory controller determines whether to process the request of the host by itself, according to various embodiments of the present disclosure. FIG. 5 may show an example of operation S3 performed by the memory controller.

Referring to FIG. 5, in operation S31, the first memory controller 205 may determine whether there is another memory controller capable of receiving and processing the request based on the states of other memory controllers. According to the embodiment, the first memory controller 205 may determine whether there is another memory controller of which the state is "Good" (when there is no problem in memory access) and "Idle" (when no other requests are being processed). If another memory controller does not exist, the first memory controller 205 may determine to process the request by itself in operation S34 regardless of its state. If the first memory controller 205 determines in operation S31 that another memory controller exists, the first memory controller 205 can determine its own state in operation S32. According to the embodiment, the first memory controller 205 may determine whether its state is "Good" and "Idle".

If the first memory controller 205 determines in operation S32 that its state is "Good" and "Idle", the first memory controller 205 may determine to process by itself in operation S34.

If the first memory controller 205 determines in operation S32 that its state is "Poor" (when there occurs a problem in memory access) or "Busy" (when other requests are being processed), the first memory controller 205 determines, in operation S33, to delegate the request to another memory controller without processing by itself.

Referring back to FIG. 4, in operation S3, if the first memory controller 205 determines to process the request by itself, the first memory controller 205 can read data from the common memory device 105 in the usual way (not shown) and can provide the data to the host 300.

In operation S3, if the first memory controller 205 determines to delegate the request to another memory controller, the first memory controller 205 may transmit the data read request to the cooperative controller 251 in operation S7 in order to delegate the data read to another memory controller.

According to the embodiment, the first memory controller 205 may further include, after operation S33 of FIG. 5, an operation of selecting a memory controller, to which the request is to be delegated. Then, the first memory controller 205 may transmit in operation S7, to the cooperative controller 251, not only the data read request but also information indicating the selected memory controller to which the request is to be delegated. According to another embodiment, the first memory controller 205 may not select a memory controller to which the request is to be delegated and may not transmit, to the cooperative controller 251, the information indicating the selected memory controller. In this case, the cooperative controller 251 can select a memory controller to which the request is to be delegated.

According to the embodiment, in operation S7, the first memory controller 205 may include a physical address, not a logical address received from the host 300, in the data read request which is transmitted to the cooperative controller 251. Typically, the memory controller may determine a physical address of the memory device, which corresponds to a logical address recognized by the host 300, and may actually write data to the physical address. Also, only each memory controller may have mapping information between the logical address and the physical address. Accordingly, when the logical address is provided to the memory controller to which the request is to be delegated, the corresponding memory controller may not recognize the physical address corresponding to the logical address. Therefore, it may be advisable that the memory controller that delegates the request of the host should find the physical address corresponding to the logical address to which the host requests access and provide the physical address to the memory controller to which the request is to be delegated.

In operation S9, the cooperative controller 251 may transmit the data read request to the memory controller (i.e., second memory controller) 207 to which the request is to be delegated. There may be various methods of transmitting the data read request and the methods may be performed according to a predetermined protocol. According to the embodiment, if a transmission method similar to the NVMe interface method is used, the cooperative controller 251 may store the data read command in the internal memory and may notify the second memory controller 207 to which the request is to be delegated that the command is present. The second memory controller 207 which has received the notification may obtain the stored data read command by reading a specific address area of the cooperative controller 251.

In operation S11, the second memory controller 207 may read data from the common memory device 105 in the usual way. In addition, the second memory controller 207 may store the data read in operation S13 in the cooperative controller 251.

In operation S15, the first memory controller 205 may obtain the read data from the cooperative controller 251. According to the embodiment, the cooperative controller 251 may store the data received in operation S13 in the memory and may transmit a notification that indicates that the delegated request to the first memory controller 205 has been completed. The first memory controller 205 which has received the notification may obtain the read data in operation S15.

In operation S17, the first memory controller 205 may transmit the read data obtained from the cooperative controller 251 to the host 300, and thus, complete the operation according to the data read request of the host 300.

As shown in FIG. 4, when it is difficult for the first memory controller 205 to immediately process the request of the host 300, the second memory controller 207 is used to immediately process the request of the host 300, thereby improving the performance of the memory system 2000.

Although the embodiment of FIG. 4 relates to the data read request, the performance can be improved by a plurality of memory controllers cooperatively processing a data write request in the same manner.

The embodiments of FIGS. 3 and 4 show a case where there are only two memory controllers. Also, even when there are three or more memory controllers that can access the common memory device 105, all these memory controllers are connected to the cooperative controller 251, and then the same operation can be performed. However, when the request can be delegated to a plurality of memory controllers, an operation of selecting one of the plurality of memory controllers to which the request can be delegated may be further included.

Figure 6:
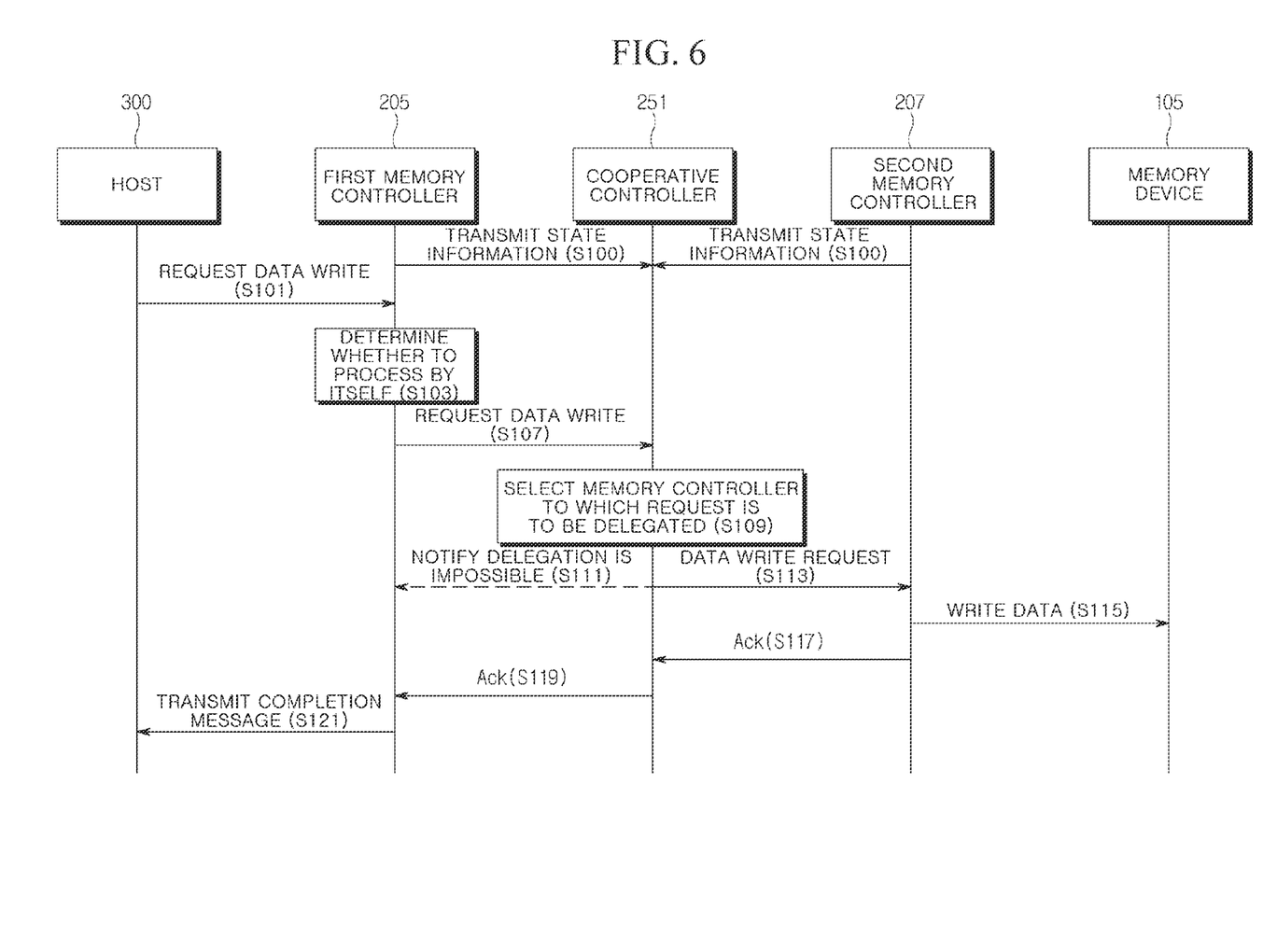
FIG. 6 is a sequence diagram showing another example of performing cooperation between the memory controllers according to various embodiments of the present disclosure.

FIG. 6 is a sequence diagram showing another example of performing cooperation between the memory controllers according to various embodiments of the present disclosure. Although the sequence diagram of FIG. 6 shows an example of performing cooperation between the memory controllers according to the data write request from the host, the performing of cooperation between the memory controllers according to the data read request from the host can also be done in the same manner.

Referring to FIG. 6, in operation S100, all memory controllers capable of accessing the common memory device 105 may transmit their state information to the cooperative controller 251. Each of the memory controllers may transmit the state information to the cooperative controller 251 periodically or when an event occurs. Here, the respective memory controllers do not transmit the state information at the same time and may transmit the state information independently of each other. Accordingly, the cooperative controller 251 can recognize in real time the state information of all memory controllers that can access the common memory device 105.

In operation S101, the host 300 may provide the first memory controller 205 with a request of writing data into the common memory device 105. According to the embodiment, when the host 300 and the first memory controller 205 make the data write request based on an NVMe interface, the host 300 may write and store a 64-byte data write command to the internal memory, and may notify the first memory controller 205 that the data write command has been written. After the first memory controller 205 receives the notification, the first memory controller 205 may obtain the data write request by reading the data write command from the internal memory of the host 300. Here, addresses to which the data is to be written, which is included in the data write command, may be a logical address recognized by the host 300.

In operation S103, the first memory controller 205 may determine whether to process the obtained data write request by itself. The first memory controller 205 may determine whether to process the request by itself based on only its own state information.

According to the embodiment, when the state of the first memory controller 205 is "Good" (when there is no problem in memory access) and "Idle" (when no other requests are being processed), the first memory controller 205 may determine to process the request by itself. When not, the first memory controller 205 may determine to delegate the processing of the request.

In operation S103, when the first memory controller 205 determines to process the request by itself, the first memory controller 205 can write data to the common memory device 105 in the usual way (not shown).

In operation S103, if the first memory controller 205 determines to delegate the request to another memory controller, the first memory controller 205 may transmit the data write request to the cooperative controller 251 in operation S107.

According to the embodiment, in operation S107, the first memory controller 205 may include a physical address, not a logical address received from the host 300, in the data write request which is transmitted to the cooperative controller 251. When the logical address is provided to the memory controller to which the request is to be delegated, the corresponding memory controller may not recognize the physical address corresponding to the logical address. Therefore, it may be advisable that the memory controller that delegates the request of the host should find the physical address corresponding to the logical address to which the host requests access and provide the physical address to the memory controller to which the request is to be delegated.

In operation S109, the cooperative controller 251 may select a memory controller to which the request is to be delegated. According to the embodiment, the cooperative controller 251 may select a memory controller to which the request is to be delegated, based on state information of each of the memory controllers. The cooperative controller 251 may review the state information of each memory controller and may select one of the memory controllers in the "Good" and "Idle" states. According to the embodiment, the cooperative controller 251 may set a priority for selection. For example, a memory controller that accesses the memory device most infrequently may be given the highest priority.

When there is no memory controller to which the request is to be delegated in operation S109, the cooperative controller 251 may transmit, to the first memory controller 205 in operation S111, a notification which indicates that delegation is impossible. The first memory controller 205 which has received the notification may process the data write request by itself. Alternatively, if the first memory controller 205 cannot process by itself, the first memory controller 205 may request delegation again to the cooperative controller 251 as many as a predetermined number of times. Finally, when delegation is impossible and the first memory controller 205 fails to process by itself, the first memory controller 205 may notify the host 300 that the writing has failed.

If a memory controller (e.g., the second memory controller 207) to which the request is to be delegated is selected in operation S109, the cooperative controller 251 may transmit the data write request to the second memory controller 207 in operation S113. There may be various methods of transmitting the data write request and the methods may be performed according to a predetermined protocol. According to the embodiment, if a transmission method similar to the NVMe interface method is used, the cooperative controller 251 may store the data write command in the internal memory and may notify the second memory controller 207 to which the request is to be delegated that the command is present. The second memory controller 207 which has received the notification may obtain the stored data write command by reading a specific address area of the cooperative controller 251.

In operation S115, the second memory controller 207 may write data to the common memory device 105 in the usual way (not shown). In addition, after completing the data writing, the first memory controller 207 may transmit ACK which indicates the completion of data writing to the cooperative controller 251 in operation S117.

In operation S119, the cooperative controller 251 may transmit the received ACK as it is or may process and transmit the received ACK to the first memory controller 205.

In operation S121, the first memory controller 205 may transmit to the host 300 a completion message which indicates that the data writing is completed, thereby completing the operation according to the data write request.

The embodiments of FIGS. 4 and 6 have an advantage that a plurality of memory controllers provided in the memory system processes the request of the host 300 in cooperation with each other to increase the performance of the memory system. FIGS. 4 and 6 show only a difference depending on whether it is the cooperative controller 251 or the memory controller 205 that is selected as a memory controller which is delegated the request of the host and processes the request, and the rest of the operations can be performed in the same manner.

Figure 7:
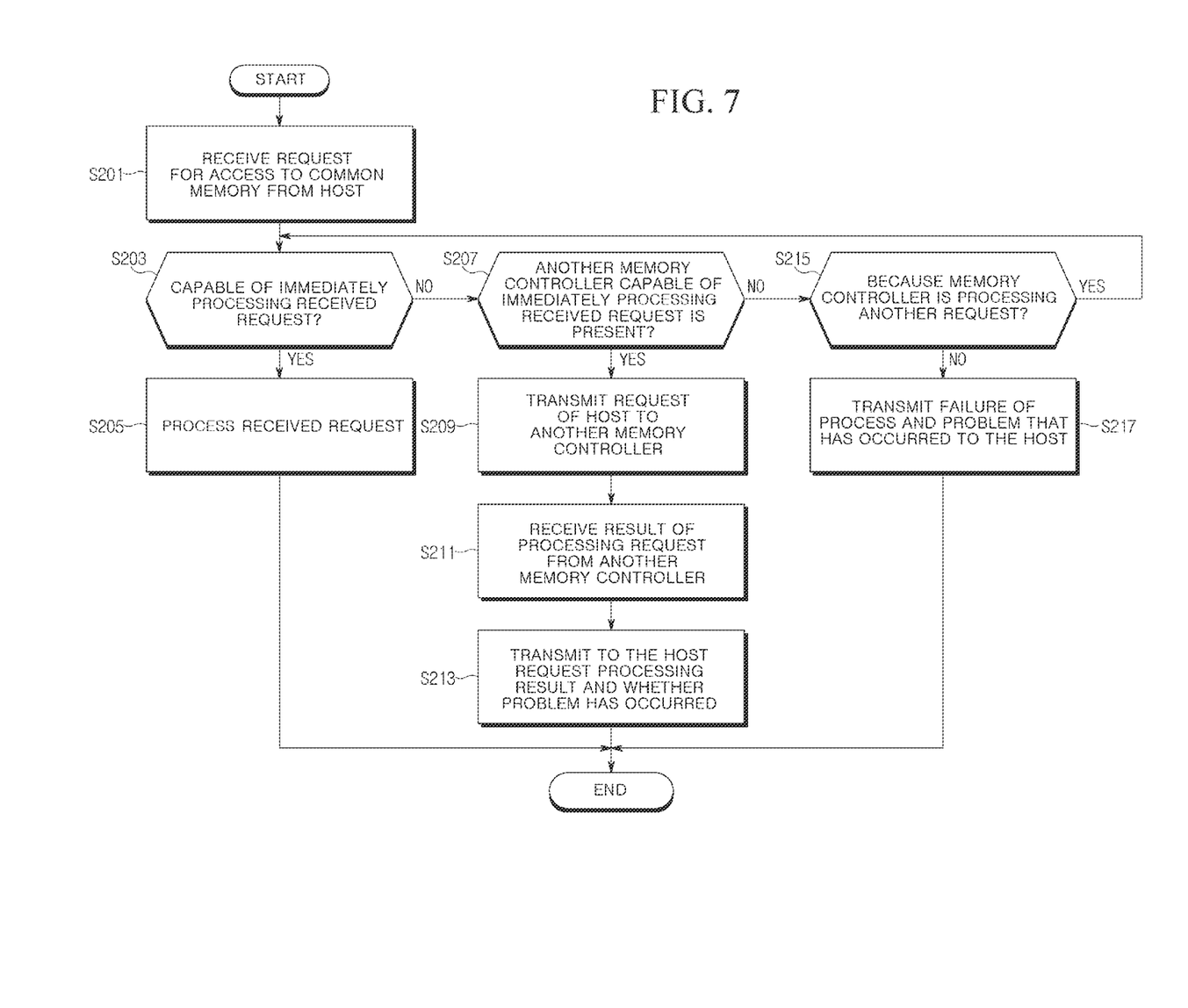
FIG. 7 is a flowchart showing an operation method of the memory controller according to various embodiments of the present disclosure.

FIG. 7 is a flowchart showing an operation method of the memory controller according to various embodiments of the present disclosure.

Referring to FIG. 7, the memory controllers 205 and 207 according to various embodiments of the present disclosure may receive, from the host 300, a request for access to the common memory device 105 in operation S201. Here, the access request may be a request to read data from the common memory device 105 or a request to write data to the common memory device 105.

In operation S203, the memory controllers 205 and 207 may determine whether the received access request can be immediately processed. According to the embodiment, when the state of the memory controllers 205 and 207 is "Good" (when there is no problem in memory access) and "Idle" (when no other requests are being processed), the memory controllers 205 and 207 may determine that they are able to immediately process the received access request.

When the memory controllers 205 and 207 determine in operation 203 that they are able to immediately process the received access request, the memory controllers 205 and 207 may immediately process the received access request in operation S205. According to the embodiment, the memory controllers 205 and 207 may write data to or read data from the common memory device 105 in accordance with the request of the host 300.

If the memory controllers 205 and 207 determine in operation 203 that they are not able to immediately process the received access request, the memory controllers 205 and 207 may determine in operation S207 whether there is another memory controller capable of immediately processing the access request received from the host 300. The memory controllers 205 and 207 may determine whether another memory controller is able to immediately process the received access request in mutual cooperation with the cooperative controller 251. According to the embodiment, the cooperative controller 251 may store pieces of state information of other memory controllers, and the memory controllers 205 and 207 may obtain the pieces of state information of other memory controllers from the cooperative controller 251 and may determine by using the state information whether a memory controller capable of immediately processing the received request is present. According to another embodiment, the cooperative controller 251 may determine whether there is a memory controller capable of immediately processing the received request based on the stored pieces of state information of other memory controllers, and may transmit a result of the determination to the memory controllers 205 and 207.

If the memory controllers 205 and 207 determine in operation S207 that there is another memory controller capable of immediately processing the received request, the memory controllers 205 and 207 may transmit the access request of the host 300 to the another memory controller in operation S209. According to the embodiment, the memory controllers 205 and 207 may transmit the corresponding access request to another memory controller via the cooperative controller 251. In operation S211, the memory controllers 205 and 207 may receive a result of processing the request from another memory controller. According to the embodiment, the memory controllers 205 and 207 may receive the result of processing the request via the cooperative controller 251. When the access request is a data read request, the request processing result may be read data, and when the access request is a data write request, the request processing result may show whether the data writing is successful or unsuccessful.

In operation S213, the memory controllers 205 and 207 may transmit to the host 300 not only the request processing result but also whether a problem has occurred. When the memory controllers 205 and 207 were not able to immediately process the access request to the common memory device 105 because of a problem in accessing the common memory device 105, the memory controllers 205 and 207 may transmit, to the host 300, the corresponding problem occurrence and/or the reason for the problem occurrence together with or independently of the request processing result.

If the memory controllers 205 and 207 determine in operation S207 that there does not exist another memory controller capable of immediately processing the received request, the memory controllers 205 and 207 may determine in operation S215 whether processing of the access request of the host is delegated to another memory controller because the memory controllers 205 and 207 are processing another request or because there is a problem in accessing the common memory device 105.

In operation S215, if the memory controllers 205 and 207 delegate the processing of the access request of the host to another memory controller because the memory controllers 205 and 207 are processing another request, the memory controllers 205 and 207 may return to operation S203 and determine whether they are able to immediately process the received request.

In operation S215, if the memory controllers 205 and 207 delegate the processing of the access request of the host to another memory controller because there is a problem in accessing the common memory device 105, the memory controllers 205 and 207 may transmit in operation S217, to the host 300, the problem that has occurred and a message indicating that the request processing is impossible, and may terminate.

As shown in FIG. 7, when the memory controllers 205 and 207 cannot immediately process the request of the host, they delegate the processing of the request of the host to another memory controller, so that the processing of the request of the host can be performed quickly without delay and the performance can be improved.

The above description is based on the memory system 2000 including one host interface shown in FIG. 3. The performance improvement method in cooperation between the memory controllers proposed in the present disclosure can be applied to various host interface structures in the same manner.

Figure 8:
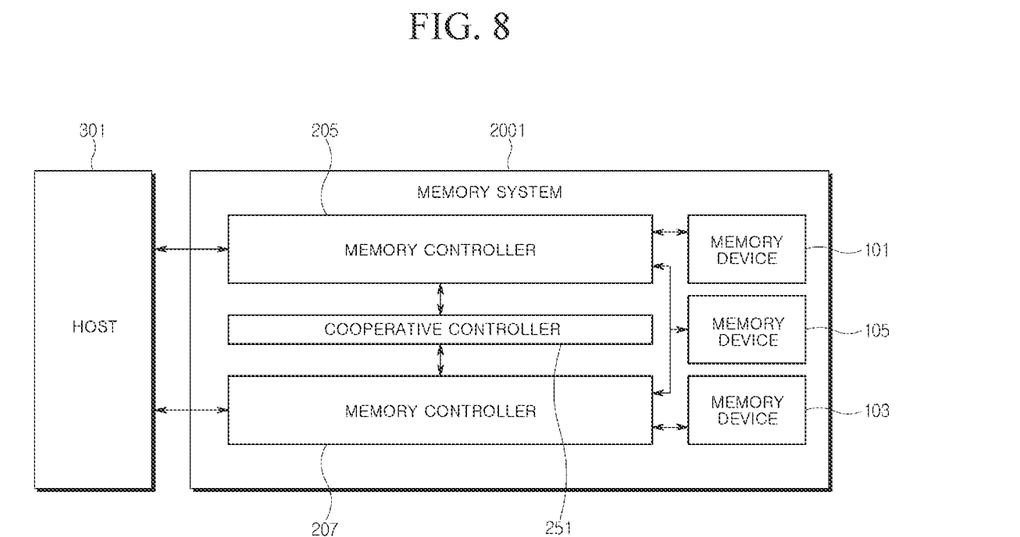
FIGS. 8 and 9 show a schematic structure of a memory system to which a common memory device access function and a host interface for each memory controller are added according to various embodiments of the present disclosure.
Figure 9:
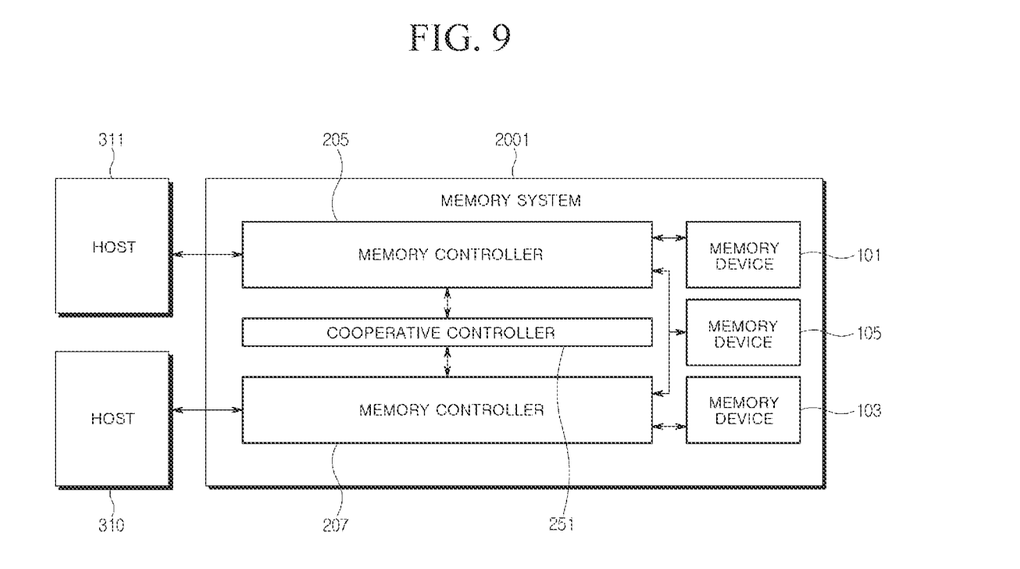

FIGS. 8 and 9 show a schematic structure of a memory system 2001 to which a common memory device access function and a host interface for each memory controller are added according to various embodiments of the present disclosure.

In FIGS. 8 and 9, the memory system 2001 shows an embodiment in which a separate host interface is provided for each of the memory controllers 205 and 207.

While it seems that there is one host interface in the memory system of FIG. 3 as viewed from the outside, it seems that there is a separate host interface for each memory controller in the memory system of FIGS. 8 and 9 as viewed from the outside. In FIGS. 8 and 9, it is possible to obtain the same structure as that of FIG. 3 by connecting a plurality of host interfaces visible from the outside to one host interface on the host side.

In the structure of FIG. 8, a host 301 includes a plurality of host interfaces, and the host interfaces of the host 301 are separately connected to the memory controllers 205 and 207 of the memory system 2001 respectively. In the case of such a structure, since it is possible to simultaneously request access to the dedicated memory devices 101 and 103, there can be obtained performance improvement in a transmission speed of the memory system compared to the structure of FIG. 3. Moreover, a request for access to the common memory device 105 may be performed by each of the memory controllers 205 and 207. Also, the access can be performed in cooperation between the memory controllers 205 and 207 proposed in the present disclosure.

In the structure of FIG. 9, a plurality of hosts 310 and 311 are separately connected to the memory controllers 205 and 207 of the memory system 2001 respectively. In the case of such a structure, since the hosts 310 and 311 can request access to the dedicated memory devices 101 and 103 respectively at the same time, there can be obtained performance improvement in a transmission speed of the memory system compared to the structure of FIG. 3. Furthermore, a request for access to the common memory device 105 by each host may be performed by each of the memory controllers 205 and 207. Also, the access can be performed in cooperation between the memory controllers 205 and 207 proposed in the present disclosure.

Although the present invention has been described with reference to the embodiments shown in the drawings, these are just examples and it will be understood by those skilled in the art that various modifications and equivalent thereto may be made. Therefore, the true technical scope of the present invention should be determined by the spirit of the following claims. Furthermore, the embodiments can be combined to form additional embodiments.

What is claimed is:

1. A memory controller comprising:
    a first external interface controller configured to:
       communicate with a first external device, and
       receive a second external device access request from the first external device;
    a second external interface controller configured to communicate with a second external device;
    a third external interface controller configured to communicate with a third external device; and
    a main controller configured to:
    determine, based on state information of the memory controller, whether to process the second external device access request by the memory controller or by a second memory controller,
    process, if determining to process the second external device access request by the memory controller, the second external device access request through the second external interface controller, and
    transmit, if determining to process the second external device access request by the second memory controller, the second external device access request to the third external device through the third external interface controller.

2. The memory controller of claim 1, wherein the main controller is further configured to transmit the state information of the memory controller to the third external device.

3. The memory controller of claim 2, wherein the state information of the memory controller comprises:
    information indicating that a problem occurs in that the memory controller does not operate normally when the second external interface controller communicates with the second external device, and information indicating that the memory controller is currently processing another access request of the first external device.

4. The memory controller of claim 3, wherein the main controller is further configured to:
obtain the second external device access request through the first external device,
process the second external device access request if the main controller determines to process the second external device access request by the memory controller based on the state information of the memory controller, and
transmit the second external device access request to the third external device such that the second memory controller, selected among a plurality of memory controllers based on state information of the plurality of memory controllers, processes the second external device access request, if the main controller determines not to process the second external device access request by the memory controller based on the state information of the memory controller.

5. The memory controller of claim 4, wherein the main controller is further configured to:
obtain the state information of the plurality of memory controllers from the third external device,
determine, among the plurality of memory controllers, a second memory controller to process the second external device access request based on the obtained state information of the plurality of memory controllers, and
transmit the second external device access request and information indicating the second memory controller to the third external device.

6. The memory controller of claim 4, wherein the main controller is further configured to:
receive a result of processing the second external device access request from the third external device, and
transmit the result to the first external device through the first external interface.

7. The memory controller of claim 3, wherein the second external interface controller is further configured to:
receive the second external device access request from the third external device,
process the second external device access request, and
transmit, to the third external device, a result of the processing of the second external device access request.

8. A memory system comprising:
a memory device;
a plurality of memory controllers,
wherein each memory controller is configured to:
access the memory device, and
determine, based on state information of each memory controller, whether to process a request for accessing the memory device by each memory controller or not, the request being provided from a first external device,
process, if determining to process the request by each memory controller, the request, and
transmit, if determining not to process the request by each memory controller, the request to a cooperative controller; and
the cooperative controller connected to the plurality of memory controllers and configured to:
receive and store a plurality of state information from the plurality of memory controllers, and
determine, based on the plurality of state information, a memory controller among the plurality of memory controllers for processing the request.

9. The memory system of claim 8, wherein the plurality of memory controllers are further configured to transmit the respective state information to the cooperative controller.

10. The memory system of claim 9, wherein the state information comprises information indicating whether there occurs a problem that a corresponding memory controller of the memory controllers does not operate normally when accessing the memory device and information indicating whether the corresponding memory controller is currently processing another access request of the first external device.

11. The memory system of claim 9, wherein a first memory controller among the plurality of memory controllers is further configured to:
receive the request from the first external device,
process, by the first memory controller, the request if the first memory controller determines to process the request by the first memory controller based on state information of the first memory controller, and
transmit the request to the cooperative controller such that the cooperative controller determines second memory controller to process the request based on the plurality of state information of the plurality of memory controllers, if the first memory controller determines not to process the request by the first memory controller based on state information of the first memory controller.

12. The memory system of claim 9, wherein the first memory controller is further configured to:
obtain the state information of the plurality of memory controllers from the cooperative controller,
determine, from the plurality of memory controllers, a second memory controller to process the request based on the state information of the plurality of memory controllers, and
transmit the request and information indicating the second memory controller to the cooperative controller.

13. The memory system of claim 12, wherein the cooperative controller is configured to:
transmit the request to the second memory controller,
receive, from the second memory controller, a result of processing the request by the second memory controller, and
transmit the result to the first memory controller.

14. The memory system of claim 11, wherein the cooperative controller is further configured to:
determine, from the plurality of memory controllers, the second memory controller to process the request based on the state information of the plurality of memory controllers, and
transmit the request to the second memory controller.

15. The memory system of claim 14, wherein the cooperative controller is further configured to:
receive, from the second memory controller, a result of processing the request by the second memory controller, and
transmit the result to the first memory controller.

16. The memory system of claim 14, wherein the cooperative controller is configured to transmit, to the first memory controller, a message indicating that none of the memory controllers is able to process the request if the cooperative controller determines that there does not exist the second memory controller to process the request based on the state information of the plurality of memory controllers.

17. The memory system of claim 16, wherein the first memory controller is further configured to:
receive the message from the cooperative controller,
determine again, based on state information of the first memory controller, whether to process the request by the first memory controller or by another memory controller if the first memory controller previously transmits the request to the cooperative controller because the first memory controller is processing another request of the first external device, and
transmit, to the first external device, a message indicating failure of the processing of the request and a reason for the failure if the first memory controller previously transmits the request to the cooperative controller because the first memory controller does not operate normally when accessing the memory device.

18. The memory system of claim 8, further comprising additional memory devices dedicated to each memory controller,
wherein each of the plurality of memory controllers comprises a first external interface, through which all the plurality of memory controller are connected to the first external device.

19. The memory system of claim 8, further comprising additional memory devices dedicated to each memory controller,
wherein each of the plurality of memory controllers comprises first external interface, through which each of the plurality of memory controllers is dedicatedly connected to different first external device, respectively.

20. An operating method of a memory system having plurality of controllers which access a memory device, the operating method comprising:
receiving, by a first controller, a request to access the memory device from a host;
determining, by the first controller, to process the request by the first controller or not based on state information of the first controller;
when determining to process the request by the first controller, processing, by the first controller, the request,
when determining not to process the request by the first controller,
determining a second controller to process the request from among the plurality of controllers;
transmitting, by the first controller, the request to the second controller;
processing, by the second controller, the request; and
transferring, by the first controller or the second controller, a result of the access to the memory device to the host.

* * * * *